United States Patent [19]

Reitberger

[11] 4,345,259

[45] Aug. 17, 1982

[54] METHOD AND APPARATUS FOR INK JET PRINTING

[75] Inventor: Peter H. Reitberger, Munich, Fed. Rep. of Germany

[73] Assignee: NCR Corporation, Dayton, Ohio

[21] Appl. No.: 190,773

[22] Filed: Sep. 25, 1980

[51] Int. Cl.³ .................. G01D 15/18; G01D 9/00
[52] U.S. Cl. ................................. 346/75; 346/1.1
[58] Field of Search .................... 346/1.1, 75, 140

[56] References Cited

U.S. PATENT DOCUMENTS

3,434,865  3/1969  Doquire et al. ............ 346/75 UX
3,570,275  3/1971  Weber et al. ............... 346/75 X
3,719,952  3/1973  Elbaum ....................... 346/75
3,786,517  1/1974  Krause ........................ 346/75

Primary Examiner—Donald A. Griffin
Attorney, Agent, or Firm—J. T. Cavender; Wilbert Hawk, Jr.; George J. Muckenthaler

[57] ABSTRACT

The ink in a continuous moving stream is caused to be deflected at a point inside the closed ink system by means of timely short pulses to effect the printing operation wherein only deflected ink in the form of ink droplets are ejected through the nozzle. The speed of the ejected droplets depends upon the speed of the continuously-flowing ink and not on the energy of the deflection pulse.

15 Claims, 11 Drawing Figures

METHOD AND APPARATUS FOR INK JET PRINTING

BACKGROUND OF THE INVENTION

In the field of non-impact printing, the most common types of printers have been the thermal printer and the ink jet printer. When the performance of a non-impact printer is compared with that of an impact printer, one of the problems in the non-impact machine has been the control of the printing operation. As is well-known, the impact operation depends on the movement of impact members such as wires or the like and which are typically moved by means of an electromechanical system which is believed to enable a more precise control of the impact members.

The advent of non-impact printing, as in the case of thermal printing, brought out the fact that the heating cycle must be controlled in a manner to obtain maximum repeated operations. Likewise, the control of ink jet printing in at least one form thereof must deal with rapid starting and stopping movement of the ink fluid from a supply of the fluid. In each case, the precise control of the thermal elements and of the ink droplets is necessary to provide for both direct and high-speed printing.

In the matter of ink jet printing, it is extremely important that the control of the ink droplets be both precise and accurate from the time of formation of the droplets to the depositing of such droplets on paper or like record media. While the method of printing with ink may be performed in continuous pulse manner or in pulse on demand manner, the latter method is disclosed in the present application as applying the features of the present invention. The drive means for the ink droplets is generally in the form of a crystal element to provide the high-speed operation for ejecting the ink through the nozzle while allowing time between droplets for proper operation.

It is therefore proposed to provide means for driving the ink to maintain high-speed ink jet printing wherein the deflection of the ink occurs at a time prior to ejection through the ink nozzle.

Representative prior art in the field of method and apparatus for ink jet printing in continuous manner includes U.S. Pat. No. 3,769,624, issued to C. H. Lee et al. on Oct. 30, 1973, which discloses a system projecting a stream of writing fluid in the form of uniformly spaced and equally-charged droplets which are then electrostatically deflected a dependent amount after passing through the ink jet nozzle.

U.S. Pat. No. 3,798,656, issued to P. Lowy et al. on Mar. 19, 1974, discloses an ink return system for a multi-jet printer which has deflection plates either at a positive or a negative potential and which includes catch chambers mechanically biased and positioned at a slight angle for receiving uncharged droplets from the nozzles.

U.S. Pat. No. 3,805,272, issued to G. J. Fan et al. on Apr. 16, 1974, discloses an ink jet recording system having means for producing a stream of ink droplets and magnetic deflection means including two spaced pole pieces forming an air gap therebetween and located beyond the nozzle for receiving the stream of droplets.

U.S. Pat. No. 3,852,768, issued to J. M. Carmichael et al. on Dec. 3, 1974, discloses a method of detecting charges on drops in an ink jet stream without contacting the stream and which includes determining the charging, the velocity of the ink stream, the extent of deflection of the ink drops originating from a nozzle and whether or not the ink stream is in operation.

U.S. Pat. No. 3,877,036, issued to K. H. Loeffler et al. on Apr. 8, 1975, discloses an ink jet printer having an electrode by the continuous stream of ink being emitted by the jet and applying a voltage so as to create an asymmetrical force field which has a component perpendicular to the ink stream direction and which affects the trajectory of the stream by deflection thereof.

And, U.S. Pat. No. 3,878,518, issued to R. L. Garwin on Apr. 15, 1975, discloses method and apparatus for amplifying the deflection of a droplet of a liquid magnetic stream wherein a static magnetic field is applied by separate deflection means which is synchronized with the formation of the ink droplets.

SUMMARY OF THE INVENTION

The present invention relates to ink jet printing, and more particularly to a printing method and apparatus wherein deflection of ink occurs within a closed ink system and only the deflected ink is ejected through the nozzle in the form of ink droplets. In this manner of printing, the speed of the ejected droplet does not depend upon the energy of the pressure wave formulating the droplet, but on the speed of the continuously-flowing ink within the closed system. It is believed that the principle of the present invention provides for a considerable increase in the printing speed.

In a preferred embodiment of the invention, ink is caused to be driven in a closed system along a path by a pump wherein a portion of the ink is deflected at one point in its travel to eject ink droplets through a nozzle which is located downstream of the one point. The ink is driven in continuous movement around the closed system and timely short pressure pulses from a deflection element deflect the ink stream in a manner to cause ejection of the ink droplets. The ink is circulated at a certain velocity and the deflection element is moved at a precise velocity to cause the ink droplet to be ejected at a high velocity from the nozzle.

One variation of the preferred arrangement for ejection of ink droplets from a continuously moving stream of ink includes the use of oppositely-positioned deflection elements to produce an ink droplet from one or another side of the ink path. Another variation provides that the ink is moving in a free flow state or condition and the pressure pulse caused by the deflection element drives the ink jet to the nozzle for ejecting an ink droplet.

The deflection element may be in the form of a piezoelectric element, it may be in the form of an electrode generating a discharge, or the deflection may be in the form of a lateral channel with hydraulic energization. Further, the deflection of the ink stream may be effected by means of an electrohydraulic pressure wave chamber or by means of applying pressure waves in a counter direction to the normal direction of ink stream flow.

In view of the above discussion, the principal object of the present invention is to provide an ink jet printing system wherein the ink is contained in a closed system and only the deflected ink in the form of droplets are caused to be ejected through the ink nozzle.

Another object of the present invention is to provide an ink jet printing system wherein the ink is caused to be continuously driven along a path and a portion of the ink is deflected and is ejected through the ink nozzle.

An additional object of the present invention is to provide an ink jet printing system wherein the ink is contained in a closed system and is not affected by the environment surrounding the ink nozzle.

A further object of the present invention is to provide a closed ink system wherein the speed of the ejected ink droplets is substantially dependent upon the speed of the continuously flowing ink.

Additional advantages and features of the present invention will become apparent and fully understood from a reading of the following description taken together with the annexed drawing.

DETAILED DESCRIPTION OF THE INVENTION

Figure 1:
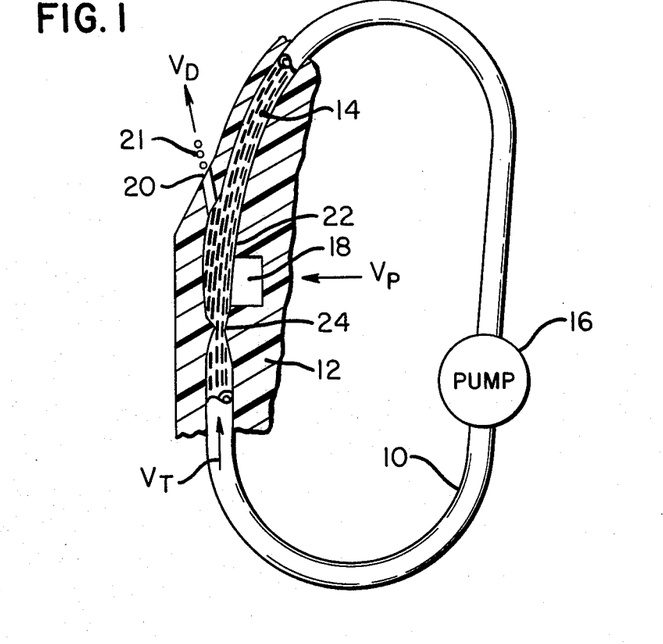
FIG. 1 shows a diagrammatic view of the principle of the present invention in a preferred arrangement thereof.

FIG. 1 shows the principle of the circulating ink system with an arrangement for deflection of ink droplets from liquid ink 14 which is carried in a closed capillary tube 10 supported in a plastic body 12. The tube 10 contains the liquid ink in a closed environment or atmosphere free from effects of the surrounding medium such as dust, gas, or mixture. The ink 14 is caused to be moved or driven in a continuous movement or flow in the closed system by means of a high pressure pump 16 and with provision for the ink to be deflected at a certain point in the stream by a deflecting element 18. The element 18 is caused to produce a pressure pulse or wave into the path of the ink stream and perpendicular thereto at a velocity $V_P$ at the time the travelling ink is moving at a velocity $V_T$. By reason of the pressure pulses being directed into the ink stream, droplets 21 of the ink 14 are caused to be moved through a nozzle 20 at a velocity $V_D$.

The ink 14 is subjected to a "turning over" effect by the geometry of the tube 10, the placement of the deflecting element 18 and the nozzle 20, and also by the speed at which the ink is travelling past these precise points in the circulating system. The right side of the tubular portion of the plastic body 12, at a point adjacent the deflecting element 18 and prior to the position of the nozzle 20, includes an adhering wall portion 22 which is utilized in controlling the flow of the ink 14 prior to ejection of droplets 21 through the nozzle 20.

When the moving ink 14 is deflected or moved by a pulse from the element 18, and after passing a reduced cross-section portion 24 of the tubular portion of the body 12 upstream of the deflecting element 18, the stream of ink has a tendency to "turn over" to the left side of the tube 10. While the viscosity of the ink is an element in causing the ink to tend to cling or adhere to the wall portion 22 of the tube 10, the well-known Coanda effect also causes the ink to adhere to the convex inner surface of the tube and the ink is caused to move in a laminar-like flow in the area of the nozzle 20. Since the left side of the tube 10 opposite the deflecting element 18 is not affected by the ink tending to adhere to the wall portion, the flow of ink 14 becomes stable beyond and downstream of the nozzle 20.

The velocity $V_D$ of the ink droplets 21 from the nozzle 20 depends upon the velocity $V_T$ of the travelling ink 14 and upon the velocity $V_P$ of the pressure pulses from the deflecting element 18 to produce the wave motion to eject the ink in the form of such droplets 21 from the nozzle 20. Since the ink droplet velocity $V_D$ is dependent in part on the velocity of the circulating ink 14, the pump pressure can be varied within wide limits to change the velocity of the moving ink within the tube 10. It is important to note that the deflection of the ink 14 occurs within the closed system and only the deflected ink in the form of droplets 21 are ejected through the nozzle 20.

Figure 2:
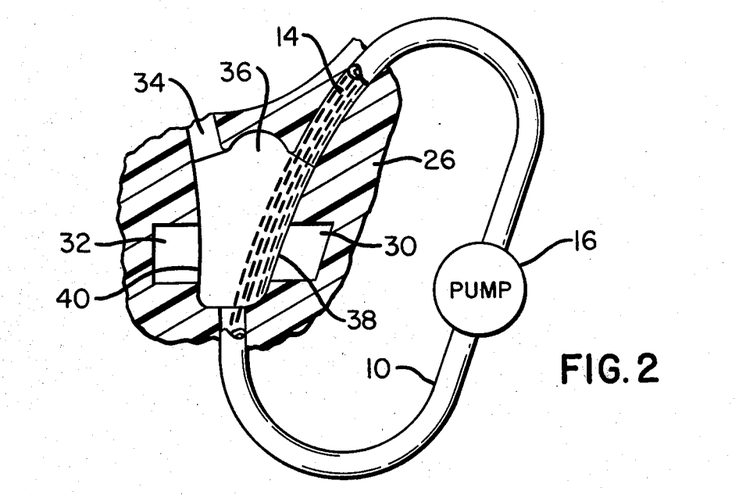
FIG. 2 is a view similar to FIG. 1 and showing a modification thereof.

FIG. 2 shows an adhereing jet element with two stable runs of ink feeding in connection with the ink ejection nozzle. The closed capillary tube 10 is supported in a plastic mold 26 for carrying the ink 14 in a circulating and continuous moving manner by means of the high pressure pump 16. A pair of deflection elements 30 and 32 are disposed on either side of the flow of ink 14 downstream of the pump 16 and upstream from a nozzle 34 formed as an outlet of a cavity 36 in the plastic mold 26. The cavity 36 adjacent the element 30 includes an adhering wall portion 38 and the cavity 36 includes an adhering wall portion 40 adjacent the deflecting element 32. Wherein the ink tends to adhere to the wall surfaces by reason of the Coanda effect, mentioned above. In this arrangement, for an ink droplet to be produced it is necessary that either the element 30 or the element 32 be actuated to cause the ink jet stream to "turn over" from one stable run to the other stable run.

Figure 3:
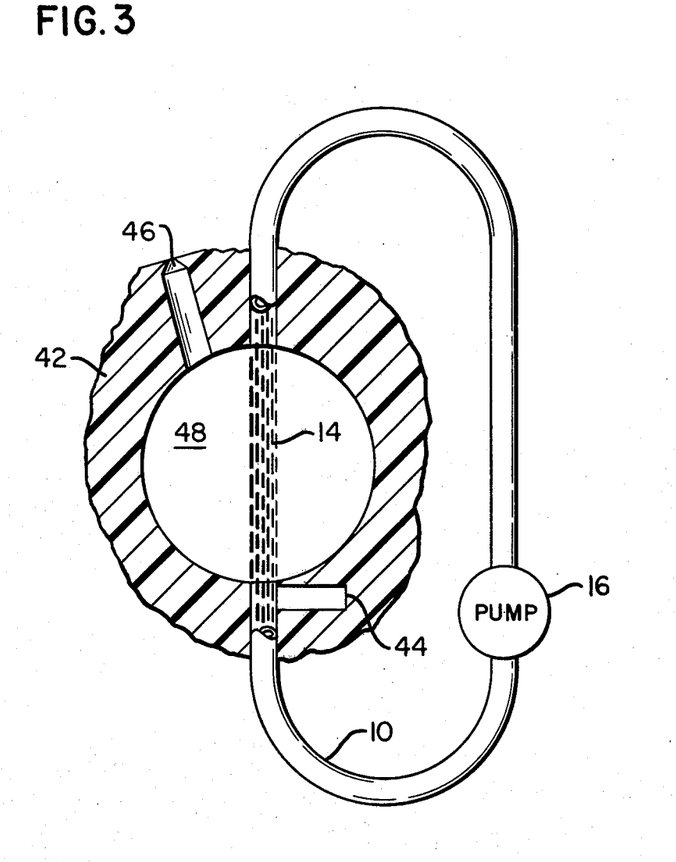
FIG. 3 is a diagrammatic view of an arrangement showing the flow of ink in a free state and in position to be deflected toward the nozzle.

FIG. 3 shows an arrangement of a closed ink system with the capillary tube 10 being supported in a plastic mold 42 for carrying the ink 14 in a circulating and continuous moving manner by means of the high pressure pump 16. A deflection element 44 is provided upstream of a nozzle 46 which is formed as an outlet of a cavity 48 in the plastic mold 42. In this arrangement, the ink stream 14 is in a free flowing state and is considered to be in a stable condition as it is caused to be continuously driven in its path through the cavity 48. The ink 14 in the stream thereof is not affected by wall adhering effect as in FIGS. 1 and 2 but rather is affected by characteristic dynamic or inertia forces for stability in the free flow condition. When the element 44 is actuated the pressure pulse moves the free flowing jet of ink to turn over the nozzle 46 and the pressure pulse or wave is effective within the nozzle 46 to eject the ink in the form of droplets therefrom.

Figure 4:
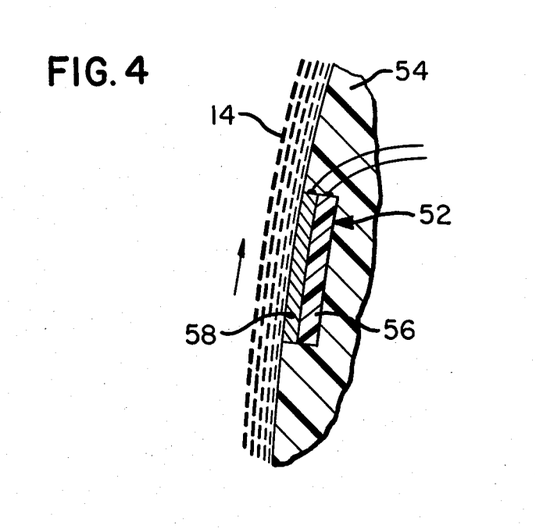
FIG. 4 is a diagrammatic view of the ink flow and showing a particular deflection element.

FIG. 4 shows another arrangement of ink flow deflection wherein the ink 14 is caused to be driven or moved in the direction of the arrow and the deflection is actuated by means of a piezoelectric device 52 carried in a plastic mold 54. The deflection device 52 comprises a ceramic bending element 56 and a steel plate 58 adjacent the ink stream for causing pressure pulses or waves to form the ink droplets. The ceramic element 56 is energized from an electric voltage which causes bending or deforming of the element and acts upon the plate 58 to produce the pressure pulses or waves.

Figure 5:
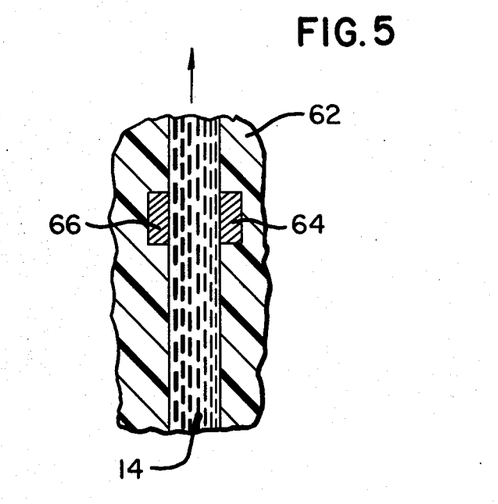
FIG. 5 is a view showing an alternate deflection element arrangement.

FIG. 5 shows the stream of ink 14 carried in a plastic mold 62 and deflected by an electric spark between electrodes 64 and 66 to generate the pressure waves necessary for ejection of the ink droplets.

Figure 6:
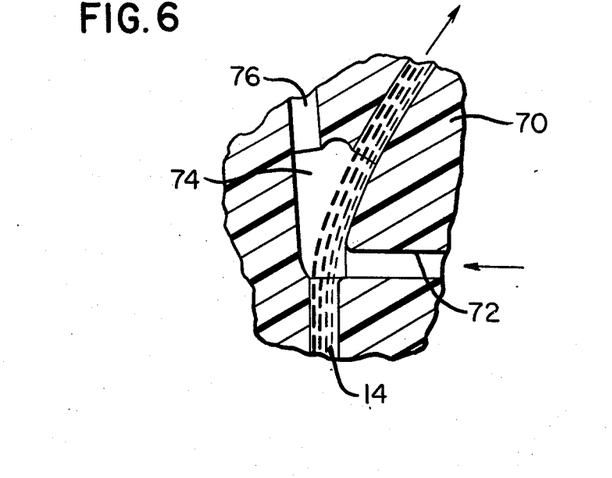
FIG. 6 is a view showing a further alternate deflection means.

FIG. 6 shows the stream of ink 14 carried in a plastic mold 70 and including a channel or passageway 72 disposed laterally from the ink stream and positioned for carrying hydraulic flow to deflect the ink stream into a cavity 74 and then eject ink in the form of droplets from a nozzle 76.

Figure 7:
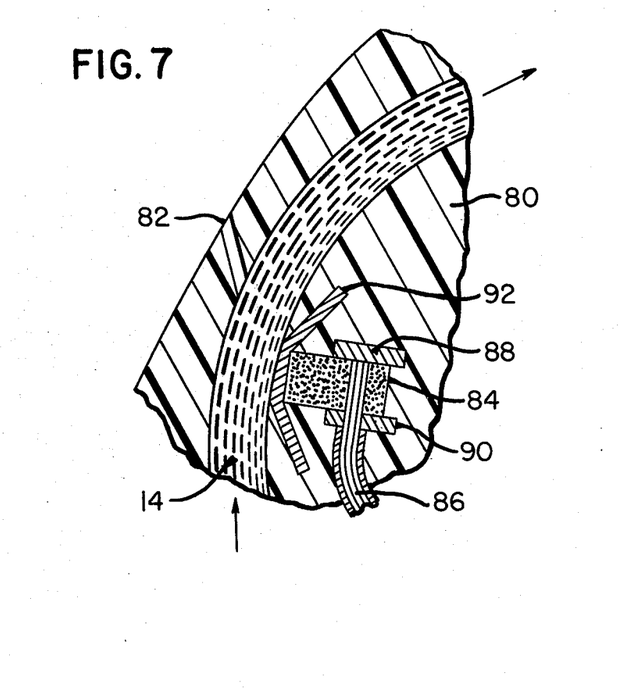
FIG. 7 is a view showing a still further alternate deflection means.

FIG. 7 shows the stream of ink 14 carried in a plastic mold 80 and includes means for deflecting the ink from the stream and out through the nozzle 82. The deflecting means includes an oil or like viscous liquid contained in a chamber 84 which has a central conductor 86 disposed through the chamber and connecting with a plate element 88. A second plate 90 is used as a portion of an R-C circuit for actuating the fluid in the chamber 84 to cause a foil element 92 to move and to generate pressure waves in the ink stream 14 and thus cause ejection of ink droplets through the nozzle 82. The principle of operation in this arrangement is based on the "inverse pinch" effect of generating the pressure waves in a manner as more fully described in a copending application Ser. No. 193,570 of the same inventor.

Figure 8:
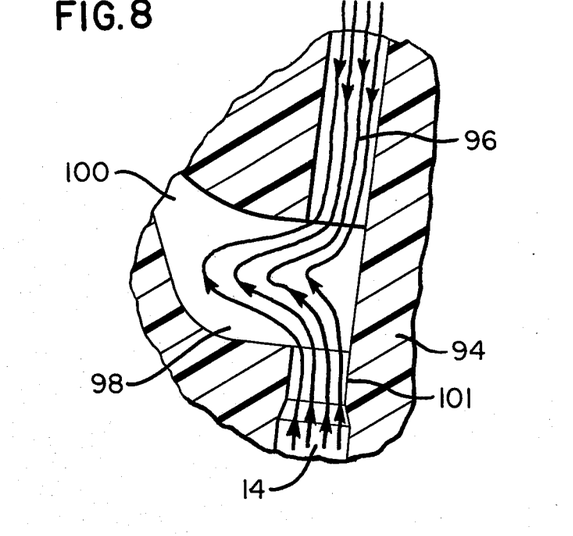
FIG. 8 is a view showing a counter-directed deflection means.

FIG. 8 shows means for deflecting the ink 14 by applying pressure waves in a counter or opposite direction to the normal flow of the ink through the tubular portion formed in the plastic mold 94. The stream of ink 14 is caused to flow upwardly and is subjected to pressure pulses 96 to cause the ink flow to take the form as shown in the cavity 98 and to eject ink as ink droplets through the nozzle 100. A reduced diameter or narrowed portion 101 forms a positive resistance to the flow of the ink and the cavity 98 acts as a diffusor to form a negative resistance to the flow of ink. In a manner of the combination of such contraction and expersion of the ink flow, it is possible to keep the resulting total resistance of the ink low for the passage of ink droplets through the nozzle 100.

Figure 9:
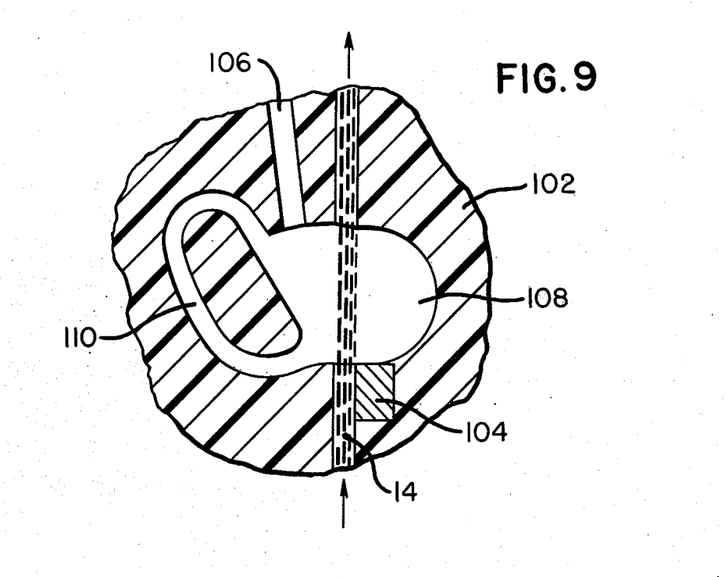
FIG. 9 is a view showing a feedback channel arrangement of the ink system.

FIG. 9 shows the stream of ink 14 carried in a plastic mold 102 and a deflection element 104 is provided upstream of a nozzle 106 formed as an outlet of a cavity 108 in the plastic mold. A feed back channel 110 is formed in the plastic mold 102 for measurably controlling and thereby determining the duration of the run of the ink stream through the outlet nozzle 106. The feed back path uses the hydraulic effect to "turn over" the ink jet from the left side to the right side and the duration of the ink jet run at the left side is determined by the volume of the channel 110.

Figure 10:
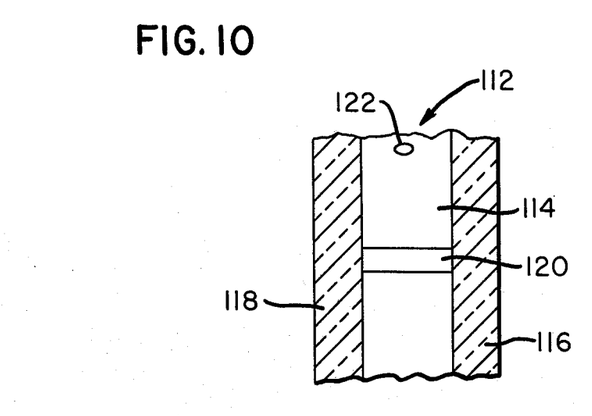
FIG. 10 shows a particular design of a deflection element.

FIG. 10 shows a representative deflection element 112 having an ink stream guide 114 contained by glass plates 116 and 118 along with an ink inlet 120 and a nozzle 122.

Figure 11:
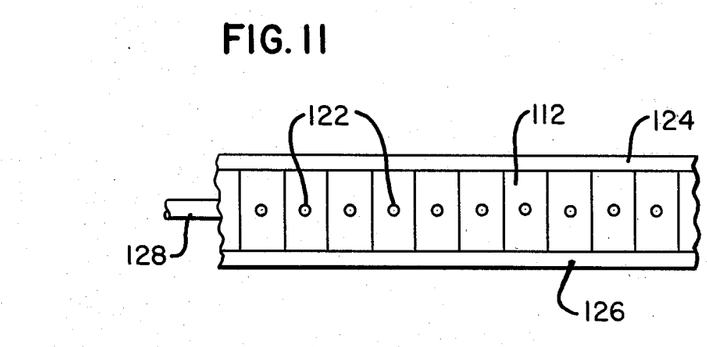
FIG. 11 shows an arrangement of deflection elements along a line of printing.

FIG. 11 shows a plurality of the deflection elements 112 of FIG. 10 carried by supports 124 and 126 along with an ink supply line 128 for the plurality of nozzles 122.

It is thus seen that herein shown and described is a closed ink system wherein the ink is caused to be moved in continuous manner and means is used to deflect the ink from a stable stream and to cause ejection of ink in the form of droplets through a nozzle. The apparatus of the present invention enables the accomplishment of the objects and advantages mentioned above and, while a preferred embodiment and several modifications thereof have been disclosed herein, other variations may occur to those skilled in the art. It is contemplated that all such modifications and variations not departing from the spirit and scope of the invention hereof are to be construed in accordance with the following claims.

I claim:

1. A method of printing through a nozzle in dot matrix form on record media comprising the steps of:
   circulating a quantity of ink under pressure in stream form in a closed system;
   providing a cavity in the path of the ink stream to permit movement of ink from the stream, and
   deflecting ink from the stream within the cavity upstream of said nozzle by pressure waves transmitted enerally perpendicular through the ink stream path, said pressure waves being initiated by timed pulses from a deflection element positioned adjacent the stream path and causing ink to be moved through and formed into droplets by said nozzle and ejected in droplet form onto said record media.

2. The method of claim 1 wherein the step of circulating the ink in a closed system is accomplished by means of a pump connected in endless tubular manner.

3. The method of claim 1 wherein the step of deflecting ink from the stream within the cavity is accomplished by means of a deflection element upstream of said nozzle and downstream of a reduced stream portion.

4. The method of claim 1 wherein the step of deflecting ink from the stream within the cavity is accomplished by means of actuating one or the other element of a pair of opposed deflection elements positioned adjacent said stream path and upstream of said nozzle.

5. The method of claim 1 wherein the step of deflecting ink from the stream within the cavity is accomplished by means of a piezoelectric element positioned adjacent said stream path and upstream of said nozzle.

6. The method of claim 1 wherein the step of deflecting ink from the stream within the cavity is accomplished by means of a pair of opposed electrodes positioned adjacent said stream path and upstream of said nozzle.

7. Apparatus for non-impact printing in dot matrix manner on record media comprising
   conduit means carrying printing ink in a closed environment system,
   pump means operably associated with said system for circulating said ink under pressure along a path in continuous stream manner,
   cavity means downstream of said circulating means enabling movement of ink out of said stream path,
   an
   outlet from said cavity means defining a nozzle through which ink is ejected and formed into droplets,
   and
   means comprising a deflection element adjacent the ink stream and pulsed in timed manner for generating pressure waves generally perpendicular into and through the stream path for causing ink to be moved therefrom toward and through said nozzle.

8. The apparatus of claim 7 wherein said deflection element is positioned upstream of said nozzle and downstream of said pump means.

9. The apparatus of claim 7 wherein said generating means comprises a pair of opposed deflection elements positioned adjacent the ink stream and upstream of said nozzle and one or the other element is actuated to generate the pressure waves.

10. The apparatus of claim 7 wherein said generating means comprises a piezoelectric element positioned adjacent the ink stream and upstream of said nozzle.

11. The apparatus of claim 7 wherein the generating means comprises a pair of opposed electrodes positioned adjacent the ink stream and upstream of said nozzle.

12. The apparatus of claim 7 wherein the generating means comprises a fluid chamber and a current conducting member extending therethrough for moving ink from the stream.

13. The apparatus of claim 7 wherein said cavity means includes a feedback channel portion for measurably controlling the flow of ink through the nozzle.

14. Apparatus for non-impact printing in dot matrix manner on record media comprising
   means carrying printing fluid in a closed environment system,
   means operably associated with said system for circulating said printing fluid under pressure along a path in continuous stream manner,
   means associated with said closed system defining an outlet through which fluid is ejected in droplet form, and
   means comprising a deflection element positioned adjacent the fluid stream and pulsed in timed manner for generating pressure waves generally perpendicular into and through the stream path for causing fluid to be moved therefrom toward and through said nozzle and in droplet form onto said record media.

15. The apparatus of claim 14 wherein said generating means comprises a pair of deflection elements positioned adjacent the fluid stream and one or the other element is actuated to generate the pressure waves.

* * * * *